United States Patent
Walker et al.

(10) Patent No.: US 6,771,287 B1
(45) Date of Patent: Aug. 3, 2004

(54) GRAPHICALLY DISTINGUISHING A PATH BETWEEN TWO POINTS ON A NETWORK

(75) Inventors: Lee Anthony Walker, Watford (GB); Russell Kennett Bulmer, Hemel Hempstead (GB); Mark Douglas Cook, St Albans (GB)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/498,833

(22) Filed: Feb. 4, 2000

(30) Foreign Application Priority Data

May 10, 1999  (GB) .............................................. 9910843

(51) Int. Cl.⁷ ................................................ G09G 5/00
(52) U.S. Cl. ........................ 345/736; 345/772; 709/224
(58) Field of Search ........................ 345/700, 733–739, 345/764, 765, 767, 771, 772, 781, 810, 821, 823, 824, 835, 839, 840, 853, 854, 969; 709/220, 223, 224

(56) References Cited

U.S. PATENT DOCUMENTS

| | | | |
|---|---|---|---|
| 5,226,120 A | | 7/1993 | Brown et al. ................ 709/224 |
| 5,261,044 A | * | 11/1993 | Dev et al. .................... 345/855 |
| 5,353,399 A | * | 10/1994 | Kuwamoto et al. ......... 345/736 |
| 5,471,399 A | * | 11/1995 | Tanaka et al. ................ 716/11 |
| 5,500,934 A | * | 3/1996 | Austin et al. ................ 345/853 |
| 5,606,664 A | | 2/1997 | Brown et al. ................ 709/224 |
| 5,751,965 A | * | 5/1998 | Mayo et al. ................ 709/224 |
| 5,768,552 A | * | 6/1998 | Jacoby ........................ 345/441 |
| 5,805,166 A | * | 9/1998 | Hall et al. ................... 345/839 |
| 6,031,528 A | * | 2/2000 | Langfahl, Jr. ................ 345/734 |
| 6,219,053 B1 | * | 4/2001 | Tachibana et al. .......... 345/835 |
| 6,225,999 B1 | * | 5/2001 | Jain et al. .................... 345/734 |
| 6,239,800 B1 | * | 5/2001 | Mayhew et al. ............. 345/764 |
| 6,496,209 B2 | * | 12/2002 | Horii ........................... 345/853 |
| 6,535,227 B1 | * | 3/2003 | Fox et al. .................... 345/736 |
| 6,664,987 B1 | * | 12/2003 | Tarbox et al. ............... 345/853 |

FOREIGN PATENT DOCUMENTS

EP    0739110 A2    4/1995

OTHER PUBLICATIONS

Dialog record 01665366 & MacWEEKM v8, n4 p1(3), Jan. 24, 1994, Oski J A, *"GraceLAN Net Manager 3.0 eases data collection, storage"*.

* cited by examiner

*Primary Examiner*—Sy D. Luu
(74) *Attorney, Agent, or Firm*—McDonnell Boehnen Hulbert & Berghoff LLP

(57) ABSTRACT

Network supervising apparatus for graphically distinguishing a path between two points on a network, and a method therefor, and computer program for carrying out the method, comprising:

- a memory (21), in use, storing information relating to the components (12, 13, 14) of the network and the links (16) between those components;
- a visual display apparatus (18) connectable with said memory and including processor apparatus (19) to convert the information in said memory into a visual display on said visual display apparatus representing the components of the network and the links between these components;
- a manually operable selector (22) to select two components or links displayed on said visual display apparatus;
- said signal processor apparatus processing the signals to said visual display apparatus to visually distinguish a set of components and/or links forming a link between the selected components or links and the other components and links.

51 Claims, 4 Drawing Sheets

GRAPHICALLY DISTINGUISHING A PATH BETWEEN TWO POINTS ON A NETWORK

BACKGROUND OF THE INVENTION

The present invention relates to supervising a network, that is a network of electronic components comprising, for example, workstations, personal computers, servers, hubs, routers, bridges, switches, (hereinafter referred to as components of the network), and links between these components which may be in the form of physical cable or wireless links. The network may be a local area network (LAN), wide area network (WAN) or other types and may operate in accordance with any desired protocol.

After such a network has been installed, it is desirable for the person appointed network manager to be able to understand the technical operation of the network. In known network management systems, the manner in which the relevant data is retrieved from the managed devices, compiled and displayed has been problematic in several respects. Firstly, the data received from each of the managed devices is simply compiled and displayed as a list of data for the user to interpret. Secondly, the data does not provide information about unmanaged devices. Thirdly, information about a given network device, such as the type of device, location of the device on the network and operating speed of the device, may be contained in different sections of the compiled data. Consequently, conventional systems are cumbersome and difficult to use.

In co-pending UK patent applications numbers 9910844.1, 9910845.8, 9910838.3, 9910837.5, 9910839.1, 9910840.9 filed in the name of the assignee of the present applications and which are incorporated herein, we describe various arrangements for providing automatic interrogation of the network to thereby produce a network map which may be displayed on a visual display unit showing the components and links between the components. At its simplest, and where the component is a "managed" component, this is usually provided by interrogation using a known protocol, such as the SNMP protocol, of the so-called 'agent' of each component which stores the components unique MAC address, the type of component and the MAC addresses the components which are connected to the ports directly or indirectly.

It is desirable in this supervising capacity to be able to graphically distinguish a path between two points on a network. This is particularly useful in diagnosing problems, by tracing a path between two components. Whilst path tracing may be a relatively simple matter where there are relatively few components, in a complex network, the paths between two components will not be immediately obvious and indeed it is desirable to be able to ascertain whether there is more than one such path.

SUMMARY OF THE INVENTION

The present invention provides a network supervising apparatus comprising:
 a memory, in use, storing information relating to the components of the network and the links between those components;
 a visual display apparatus connectable with said memory and including signal processor apparatus to convert the information in said memory into a visual display on said visual display apparatus representing the components of the network and the links between these components;
 a manually operable selector to select two components displayed on said visual display apparatus;
 said processor apparatus processing the signals to said visual display apparatus to visually distinguish a set of components and/or links forming a path between the selected components and the other components and links.

The present invention also provides a method of supervising a network comprising:
 converting information relating to the components of the network and the links between those components into a visual display on a visual display apparatus representing the physical relationship between the components of the network and the links between these components;
 manually selecting two components displayed on said visual display apparatus;
 processing the information to visually distinguish a set of components and/or links forming a path between the selected components and the other components and links.

The present invention also provides a computer program on a computer readable medium for use in supervising a network, said program comprising:
 program means for accessing information relating to the components of the network and the links between those components;
 program means for converting said information into a form to provide on a visual display apparatus, a visual display, representing the physical relationship between the components of the network and the links between these components;
 program means actuated by a manually operable selector which selects two components displayed on said visual display apparatus, said program means causing said visual display apparatus to visually distinguish a set of components and/or links forming a path between the selected components and the other components and links.

The present invention also provides a computer program embodied in a carrier wave for use in supervising a network, said program comprising:
 program means for accessing information relating to the components of the network and the links between those components;
 program means for converting said information into a form to provide on a visual display apparatus, a visual display, representing the physical relationship between the components of the network and the links between these components;
 program means actuated by a manually operable selector which selects two components displayed on said visual display apparatus, said program means causing said visual display apparatus to visually distinguish a set of components and/or links forming a path between the selected components and the other components and links.

BRIEF DESCRIPTION OF THE DRAWINGS

Preferred embodiments of the invention will now be described by way of example only with reference to the accompanying drawings in which.

DESCRIPTION OF THE PREFERRED EMBODIMENTS

Figure 1:
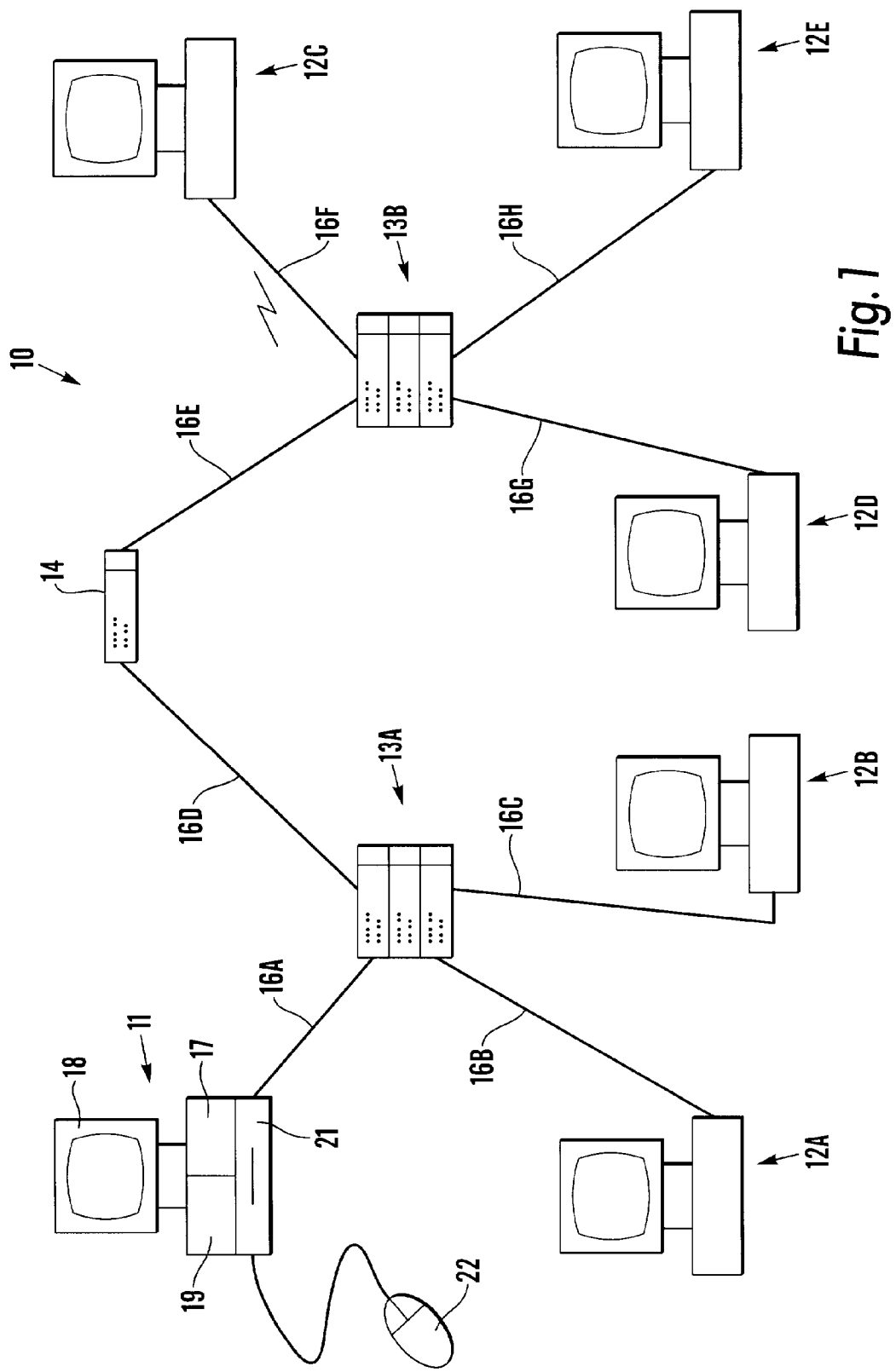
FIG. 1 is a diagrammatic view of a network incorporating a preferred embodiment of the invention.

Referring to FIG. 1 there is shown a network 10 comprising a plurality of components in the form of a network supervisor's workstation or computer 11, other workstations 12B–E, hubs 13A, 13B, and switch 14. The network is a simple network and is set out for purposes of illustration only. Other configurations and arrangements, may be used.

The components are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 (which may be local to the supervisor's workstation or elsewhere and accessible, for example, over the network) for storing a program which may have been loaded from the program store 21 or downloaded for example via Internet from a website.

Figure 2:
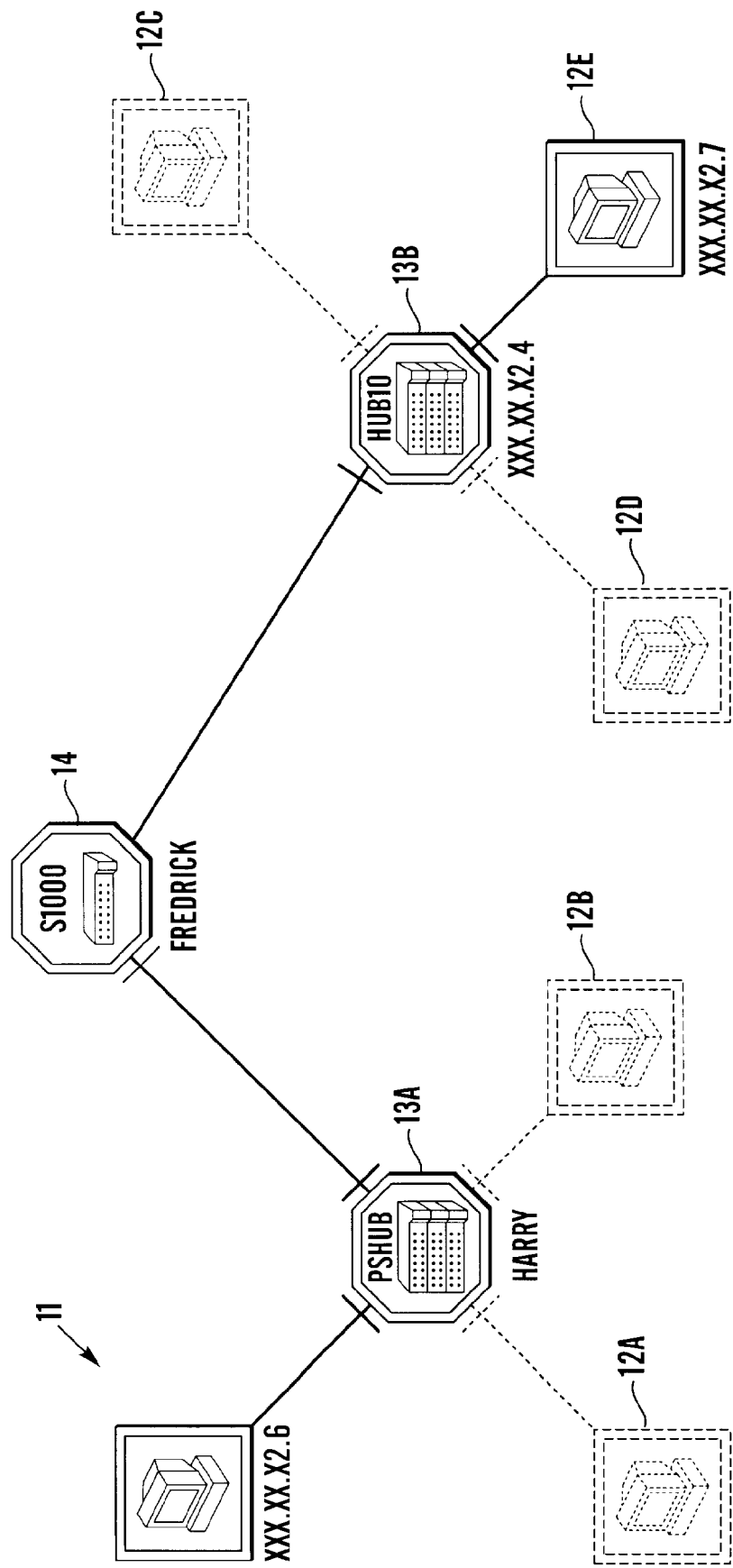
FIG. 2 is a view of one display provided on a visual display apparatus of the network of FIG. 1.
Figure 3:
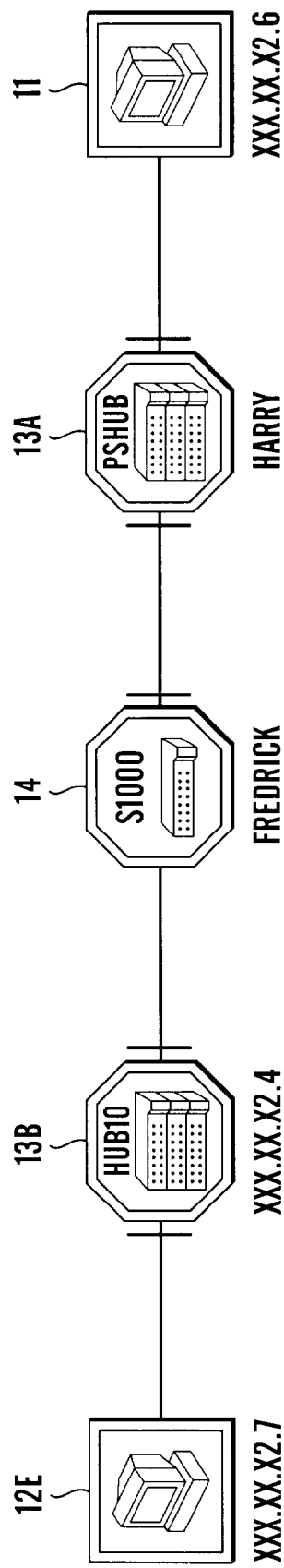
FIG. 3 is a view of an alternative display to that shown in FIG. 2, and FIG. 4 sets out the program steps in accordance with the preferred embodiment of the invention.

FIGS. 2 and 3 show different visual displays which are displayed on the visual display unit 18 of the network supervisor.

By means which is disclosed in the co-pending patent applications referred to above, the network supervisor's computer 11 may interrogate and analyse the network, and store in the memory 17 the information relating to the components within the network and the links between the components. In essence, most quality components include a so-called agent which stores information about the component such as its unique MAC number, its ID which identifies what the component is and what model type it is, how many ports it has and how they are connected, and the address to which at least some of the ports are connected. The computer 11 interrogates the agents of each component.

The computer 11 may, on command from the selector 22, process signals from the memory 17 by the signal processor 19 and provide on the visual display unit 18 a network map showing each of the components and the links therebetween. In the examples shown in FIGS. 2 and 3, the network is simple (note that the network displayed in FIG. 2 corresponds to the network shown in FIG. 1) but of course in many instances the network will be considerably more complex and it may be necessary to arrange that the visual display unit 18 only shows a simplified version or only part of the network at any one time.

In the normal mode, all of the components in the network map shown in FIG. 2 will be displayed in the same way, that is they will be emphasised to the same extent.

In carrying out the method of the present invention, it is desired by the supervisor to determine the paths between two particular components. In the example illustrated, it is desired to show the path between the computer 11 and workstation 12E. In the present instance there is only a single path but it will be understood that in real situations the path may not be so readily apparent and indeed there may be multiple paths between two selected components.

Thus the network supervisor manually selects the workstations 11 and 12E by moving a cursor under the control of the mouse 22 and clicking on to the displays of the two relevant workstations (or by manually entering the ID, identifiers of the two components via a keyboard). At this point, the signal processor 19 will act on the relevant signals and cause the visual display unit to visually distinguish the set of components and/or links (ie components 11, 13A, 14, 13B, 12E) forming a path between the two selected components from the other component and links (ie excluding components 11, 13A, 14, 13B, 12E). That visual distinction may be one of the following:

a) The set of components and/or links (ie components 11, 13A, 14, 13B, 12E) may be highlighted by increasing the contrast in their images.

b) The other components and links (ie excluding components 11, 13A, 14, 13B, 12E) may be dimmed by reducing the contrast in their images. (As shown in FIG. 2)

c) The colours of either the set, or the other components and links may be changed.

d) The other components and links may be removed from the display or map.

In the case of d), the set (ie components 11, 13A, 14, 13B, 12E) of components and links which form the link between the two selected components may be arranged in a straight line either horizontally as shown in FIG. 3 or alternatively vertically.

In the arrangement of FIG. 2, all of the network components and links are still maintained in the same position as when the path was not being displayed, including those which do not form part of the path.

As set out above, in a more complex network, there may be more than one path between the two selected components and in this case, the mouse 22 may be suitably operated, for example, by clicking the cursor on a suitable icon on the screen, to select the second and subsequent paths successively. Alternatively, particularly where the selection is carried out not by mouse but by keyboard, there may be provided plural icons or an arrow arrangement so as to direct the successive views to show different selected paths.

We have described how the network may be supervised. The method of the invention may be carried out under the control of the network supervisor's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program, or may be provided on a computer or computer memory carrying the website of, for example, the supplier of the network products. The program may be downloaded from whichever appropriate source to the memory 17 of the supervisor's workstation and used to control the processor to carry out the steps of the invention as described. Particularly in the case of downloading from a website, the program will be embodied in a carrier wave received, for example, on a telephone line or other cable or by wireless, eg infra-red link.

The program may include (see FIG. 4), a program step or means (100) for interrogating the agents of each component, a program step or means (101) for storing information relating to the components interrogated, program step or program means (102) for accessing (from the memory) the information relating to the components of the network and the links between those components, program step or means (103) for converting said information into a form to provide on the visual display apparatus a display representing the components of the network and the links between the components, on selection by the mouse or its equivalent of two components (step 104), program means (105) causes said visual display apparatus to visually distinguish a set of components and/or links forming a path between the selected components and the other components and links.

Program steps (100) and (101) may be provided by another program.

In one arrangement, program step (105) may include the following steps:

(a) Ascertain all possible paths through the network from one of the selected components,
(b) Store those paths in which the second selected component appears,
(c) Compare these paths and save only the unique paths.

Thus, for example, referring to FIG. 1 where it is intended to find all possible paths between computer 11 and workstation 12E all possible paths starting with computer 11 are listed below (a path is defined as starting with the first selected component (workstation 11) and terminating either when the path reaches the second selected component, or, when it reaches a "dead end" that is only one port is being used on a particular component):

(1) 11-13-12A
(2) 11-13-12B
(3) 11-13-14-13B-12D
(4) 11-13-14-13B-12E
(5) 11-13-14-13B-12C

The path set out in line 4 above is a unique path between computer 11 and workstation 12E.

In a more complex arrangement (for example, where there is provided another component 13C between component 14 and workstation 12E), then there will be an additional path as follows:

(6) 11-13-14-13C-12E

Figure 4:
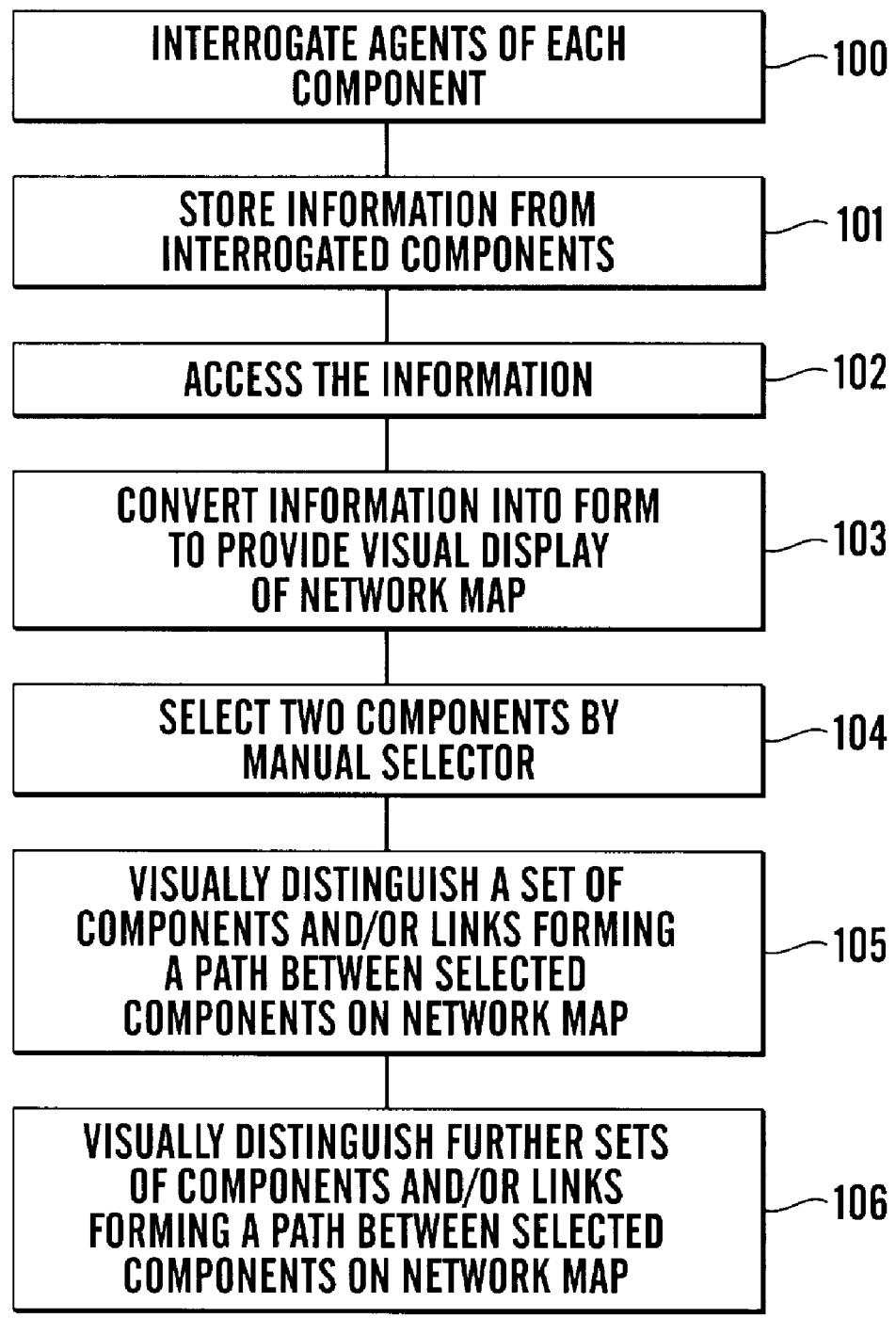

This will provide a second path which may be illustrated on suitable operation of the mouse (step 106 of FIG. 4).

The invention is not restricted to the details of the foregoing example.

What is claimed is:

1. Network supervising apparatus comprising:
   a store, in use, storing information relating to the components of the network and the links between those components;
   a visual display apparatus connected to said store and including a processor to convert the information in said store into a visual display on said visual display apparatus representing the physical relationship between the components of the network and the links between those components, said visual display comprising a network map, the network map graphically illustrating how in the network the components of the network and links communicatively coupling the components of the network are connected;
   a manually operable selector to select two components displayed on the network map on said visual display apparatus;
   said processor apparatus in use processing the signals to said visual display apparatus to change the relative appearance of a set of components on the network map forming a path between the selected components from the other components to visually distinguish them on the network map.

2. Network supervising apparatus as claimed in claim 1 in which said manually operated selector, or a further manually operated selector, is adapted to select a further set of components forming a second path between the selected components, the signal processing apparatus being adapted to change the relative appearance of the second set of components from the other components and links on further operation of said manually operated selector or operation of said further manually operated selector to visually distinguish them on the network map.

3. Network supervising apparatus as claimed in claim 1 in which the network supervising apparatus is controlled by means of a computer program.

4. Network supervising apparatus as claimed in claim 1 in which the change of appearance comprises reducing the contrast of said other components and links.

5. Network supervising apparatus as claimed in claim 1 in which the change of appearance comprises increasing the contrast of the selected set of components.

6. Network supervising apparatus as claimed in claim 1 in which the change of appearance comprises changing the colour of either said set of components or said other components and links.

7. Network supervising apparatus as claimed in claim 1 in which the change of appearance comprises removing the images of said other components and links from the visual display.

8. Network supervising apparatus as claimed in claim 7 in which the displayed components are arranged linearly.

9. Network supervising apparatus as claimed in claim 8 in which the displayed components are arranged horizontally.

10. Network supervising apparatus as claimed in claim 8 in which the displayed components are arranged vertically.

11. Network supervising apparatus as claimed in claim 1 in which said set of components includes the selected components.

12. The network supervising apparatus of claim 1, wherein said processing apparatus further changes the relative appearance of a set of components and links on the network map forming the path between the selected components from the other components to visually distinguish them on the network map.

13. Network supervising apparatus as claimed in claim 1, in which said manually operated selector, or a further manually operated selector, is further adapted to select a set of components and links forming a second path between the selected components, the signal processing apparatus being adapted to change the relative appearance of the second set of components and links from the other components and links on further operation of said manually operated selector or operation of said further manually operated selector to visually distinguish them on the network map.

14. A method of supervising a network comprising:
   converting information relating to the components of the network and the links between those components into a visual display on a visual display apparatus representing the physical relationship between the components of the network and the links between these components said visual display comprising a network map, the network map graphically illustrating how in the network the components of the network and links communicatively coupling the components of the network are connected;
   manually selecting two components displayed on the network map on said visual display apparatus;
   processing the information to change the relative appearance of a set of components on the network map forming a path between the selected components from the other components and links to visually distinguish them on the network map.

15. A method as claimed in claim 14 including manually selecting a further set of components forming a second path between the selected components, and changing the appearance of the second selected set of components.

16. A method as claimed in claim 14 in which the method is controlled by means of a computer program.

17. A method as claimed in claim 14 in which the change of appearance comprises reducing the contrast of said other components and links.

18. A method as claimed in claim 14 in which the change of appearance comprises increasing the contrast of the selected set of components.

19. A method as claimed in claim 14 in which the change of appearance comprises changing the colour of either said set of components or said other components and links.

20. A method and claimed in claim 14 in which the change of appearance comprises removing the images of said other components and links from the visual display.

21. A method as claimed in claimed 20 wherein the displayed components are arranged linearly.

22. A method as claimed in claimed 21 wherein the displayed components are arranged horizontally.

23. A method as claimed in claimed 21 wherein the displayed components are arranged vertically.

24. A computer program on a computer readable medium loadable into a digital computer, said computer program comprising software for performing the steps of claim 14.

25. A method as claimed in claim 14 in which said set of components includes the selected components.

26. The method of claim 14 wherein processing the information comprises processing the information to change the relative appearance of a set of components and links on the network map forming the path between the selected components from the other components and links to visually distinguish them on the network map.

27. A method as claimed in claim 14 including manually selecting a further set of components and links forming a second path between the selected components, and changing the appearance of the second selected set of components and links.

28. A computer program on a computer readable medium for use in supervising a network, said program comprising:
program means for accessing information relating to the components of the network and the links between those components;
program means for converting said information into a form to provide a visual display on a visual display apparatus representing the physical relationship between the components of the network and the links between these components, said visual display comprising a network map, the network map graphically illustrating how in the network the components of the network and links communicatively coupling the components of the network are connected;
program means actuated by a manually operable selector which selects two components displayed on the network map on said visual display apparatus, said program means causing said visual display apparatus to change the relative appearance of a set of components on the network map forming a path between the selected components from the other components and links to visually distinguish them on the network map.

29. A computer program as claimed in claim 28 including program means actuated by further manual operation of said selector, or operation of a further manually operated selector to select a further set of components forming a second path between the selected components, said program means causing said visual display apparatus to change the appearance of the second selected set of components on further operation of said manually operated selector or operation of said further manually operated selector.

30. A computer program as claimed in claim 28 in which the change of appearance comprises reducing the contrast of said other components and links.

31. A computer program as claimed in claim 28 in which the change of appearance comprises increasing the contrast of the selected set of components.

32. A computer program as claimed in claim 28 in which the change of appearance comprises changing the colour of either said set of components or said other components and links.

33. A computer program as claimed in claim 28 in which the change of appearance comprises removing the images of said other components and links from the visual display.

34. A computer program as claimed in claim 33 wherein the displayed components are arranged linearly.

35. A computer program as claimed in claim 34 wherein the displayed components are arranged horizontally.

36. A computer program as claimed in claim 34 wherein the displayed components are arranged vertically.

37. A computer program as claimed in claim 28 in which said set of components includes the selected components.

38. The computer program of claim 28 wherein the program means further causes said visual display apparatus to change the relative appearance of a set of components and links on the network map forming the path between the selected components from the other components and links to visually distinguish them on the network map.

39. A computer program as claimed in claim 28 including program means actuated by further manual operation of said selector, or operation of the further manually operated selector to select a further set of components and links forming a second path between the selected components, said program means causing said visual display apparatus to change the appearance of the second selected set of components and links on further operation of said manually operated selector or operation of said further manually operated selector.

40. A computer program embodied on a carrier wave for use in supervising a network, said program comprising:
program means for accessing information relating to the components of the network and the links between those components;
program means for converting said information into a form to provide a visual display on a visual display apparatus representing the physical relationship between the components of the network and the links between these components, said visual display comprising a network map, the network map graphically illustrating how in the network the components of the network and links communicatively coupling the components of the network are connected;
program means actuated by a manually operable selector which selects two components displayed on the network map on said visual display apparatus, said program means causing said visual display apparatus to change the relative appearance of a set of components on the network map forming a path between the selected components from the other components and links to visually distinguish them on the network map.

41. A computer program as claimed in claim 40 including program means actuated by further manual operation of said selector, or operation of a further manually operated selector to select a further set of components forming a second path between the selected components, said program means causing said visual display apparatus to change the appearance of the second selected set of components on further operation of said manually operated selector or operation of said further manually operated selector.

42. A computer program as claimed in claim 40 in which the change of appearance comprises reducing the contrast of said other components and links.

43. A computer program as claimed in claim 40 in which the change of appearance comprises increasing the contrast of the selected set of components.

44. A computer program as claimed in claim 40 in which the change of appearance comprises changing the colour of either said set of components or said other components and links.

45. A computer program as claimed in claim 40 in which the change of appearance comprises removing the images of said other components and links from the visual display.

46. A computer program as claimed in claim 45 wherein the displayed components are arranged linearly.

47. A computer program as claimed in claim 46 wherein the displayed components are arranged horizontally.

48. A computer program as claimed in claim 46 wherein the displayed components are arranged vertically.

49. A computer program as claimed in claim 40 in which said set of components includes the selected components.

50. The computer program of claim 40 wherein the program means further causes said visual display apparatus to change the relative appearance of a set of components and links on the network map forming the path between the selected components from the other components and links to visually distinguish them on the network map.

51. A computer program as claimed in claim 40 including program means actuated by further manual operation of said selector, or operation of a further manually operated selector to select a further set of components and links forming the second path between the selected components, said program means causing said visual display apparatus to change the appearance of the second selected set of components and links on further operation of said manually operated selector or operation of said further manually operated selector.

* * * * *